Jan. 20, 1953
E. G. SCHAIRER
2,625,709
METHOD AND APPARATUS FOR INTENSELY
WORKING PLASTIC MATERIALS
Filed Oct. 29, 1948
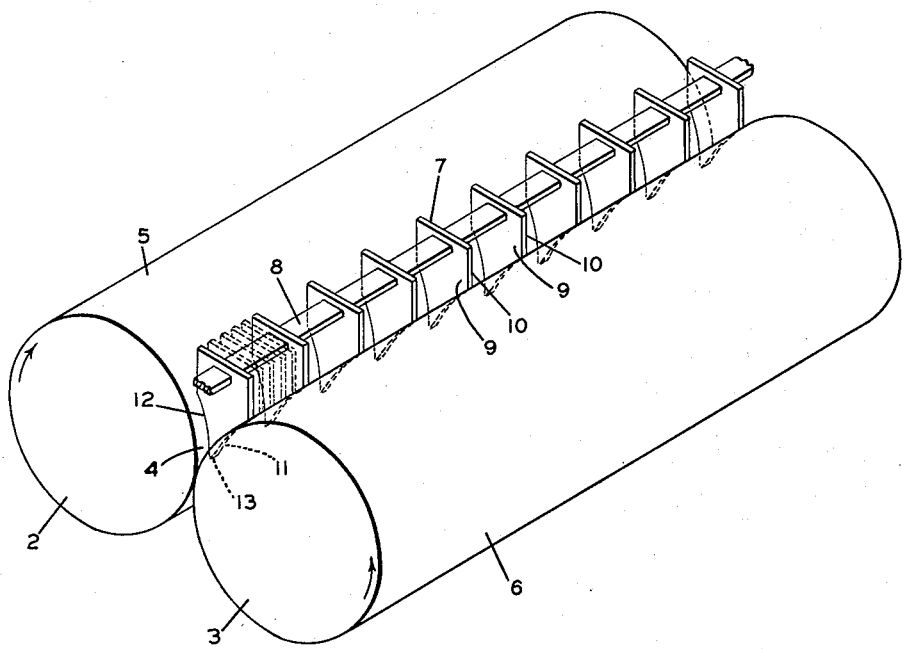
Inventor
EDWARD G. SCHAIRER
by
Walter Kaufman
Attorney Patented Jan. 20, 1953

2,625,709

UNITED STATES PATENT OFFICE 2,625,709

METHOD AND APPARATUS FOR INTENSELY WORKING PLASTIC MATERIALS

Edward G. Schairer, Manheim Township, Lancaster County, Pa., assignor to Armstrong Cork Company, Lancaster, Pa., a corporation of Pennsylvania Application October 29, 1948, Serial No. 57,243

12 Claims. (Cl. 18—2)

This invention relates to a method and apparatus for intensely working plastic materials and is directed more particularly to a method and apparatus in which a mass of plastic material is converted into a sheet.

In the manufacture of sheet materials from plastics, such as floor and wall coverings from linoleum compositions or from the more modern synthetic resin-bound plastic compositions, it is sometimes desirable to intensely work the composition immediately prior to sheeting in order to obtain a surface free of imperfections, such as crazing, alligatoring, and other surface defects which are sometimes encountered when the plastic mass is calendered.

It is an object of this invention to provide a method wherein a plastic mass will be worked intensely immediately prior to its entrance into the extrusion zone where sheet formation occurs, as in the nip between a pair of calender rolls.

Another object of the invention is to provide a calender with an arrangement for developing heat within the mass to be calendered by intense working of the mass as it enters the extrusion zone of the calender.

A further object of the invention is to provide a method and apparatus which will be effective for inducing an intense turbulence within a mass of thermoplastic material to be sheeted substantially coincident with sheet formation.

An additional object is to provide an apparatus in which intense working of a mass of plastic composition will be effected immediately prior to sheet formation by extrusion of the mass through an extrusion zone and in which such working is accomplished by a combined turbulent action and a lateral displacement of the mass at a plurality of spaced locations along the length of the extrusion zone.

According to preferred practice, small increments of the mass are turbulently worked adjacent the nip between oppositely rotating calender rolls which thus present curved extrusion surfaces which are moving toward the nip. This working develops heat within the increments of the mass, and they are fed directly into the nip between the rolls. The turbulent working of the mass is preferably effected by providing a plurality of closely spaced dividers in the nip between the rolls and extending outwardly therefrom. These dividers present opposed working surfaces which extend at an angle to the length of the nip, and as the material is moved into the nip by the action of the rolls, the working surfaces cooperate with the rolling action set up by the advancing curved surfaces of the rolls to create a turbulent action within the increments of the mass which are disposed in the areas bounded by the working surfaces of the dividers and the curved roll surfaces. There is also some lateral flow of the mass beyond the tips of the dividers as it enters the nip and this lateral displacement along the axes of the rolls combines with the turbulent working of the mass to condition it properly for extrusion between the calender rolls.

A preferred embodiment of the apparatus of the invention is illustrated in the attached drawing, in which the single view is a perspective diagram.

The apparatus includes a pair of calender rolls 2 and 3 which are rotated in the direction of the arrows. The rolls 2 and 3 define a nip 4 therebetween which extends parallel to the axes of the rolls. The working surfaces 5 and 6 of the roll are curved and are spaced apart at the nip a distance sufficient to produce a sheet of the desired thickness.

A plurality of dividers 7 are provided. These dividers 7 are mounted upon a support 8 which is diagrammatically illustrated in the drawing and extends parallel to the nip 4 being rigidly affixed to the frame of the calender. In the drawing, the dividers are shown spaced a substantial distance apart in order to clearly disclose the positioning of the dividers and the location of the rigid support 8. Only every fifth divider has been shown in solid lines in the drawing; certain intermediate dividers have been shown in dotted lines. It will be understood that in the actual construction of the device the dividers will be spaced close together, generally as indicated in the left-hand portion of the drawing where the dotted line representation of the dividers appears. The showing of the dividers and their support has been made diagrammatic in order to portray their general nature. The dividers may be adjustably mounted and may be so shaped as to facilitate the charging of the material into the nip. The present invention is not limited to such constructional details, however, and they have not been illustrated or described.

Each divider has two flat faces 9 and 10 which are disposed at an angle with respect to the length of the nip 4. Preferably, the dividers are so positioned that the flat faces 9 and 10 are disposed at right angles to the nip, as shown in the drawing. The dividers are curved at 11 and 12 along their edges to correspond generally to the curvature of the surfaces 5 and 6 of the calender rolls 2 and 3 and they are so positioned that these surfaces 11 and 12 lie substantially in the curvature of the rolls and preferably in engagement therewith. Where the sheet is to be formed directly on a backing such as a sheet of burlap in calendered linoleum, the backing will be fed over one of the rolls and through the nip. The dividers will then be positioned to engage one of the rolls and lie close to the burlap or other backing travelling with the other roll. The backing material will thus serve as one of the curved surfaces travelling toward the nip of the rolls. Each of the dividers terminates in an apex 13 which extends into the nip 4 and each apex is preferably disposed substantially in the plane of the axes of the rolls 2 and 3, or slightly to the rear thereof in the direction of travel of the rolls.

The dividers 7 may be made of hard wood, such as maple, and may be about 1⅛ inches thick. They are preferably spaced about 1½ inches apart, from the face 9 of one divider to the opposite face 10 of the next adjacent divider. The size and spacing of the dividers will vary depending upon the size of the calender, the viscosity of the plastic mass, the calender temperatures, the gauge of the sheet to be produced, the size of the particles fed to the calender, and other variable factors.

In the practice of the method, a mass of plastic material is fed to the rolls 2 and 3 and is drawn down in between the plates 7 as small increments. As the material is drawn toward the nip 4, a turbulent action is created by the movement of the plastic material along the curved surfaces 5 and 6 of the rolls 2 and 3 (one of which may have a backing web travelling with it) and against the surfaces 9 and 10 of the dividers 7. The plastic material also flows laterally along the rolls under the tips of the dividers. These turbulent actions intensely work the mass and considerable frictional heat is developed. The intensity of the working increases as the material is crowded into the nip 4 where actual sheet formation occurs. It is here also that the plastic material flows laterally below the apexes 13 of the dividers 7 as it enters the extrusion zone, and a continuous sheet is formed. As a result of the intense working, the mass attains a substantially elevated temperature and a reduced plasticity or stiffness as it enters the extrusion zone at the nip 4; and the turbulent action which is accomplished apparently aids in eliminating checking, alligatoring, and other surface defects. I do not wish to be limited to this theory, but is does offer an explanation for the improved result which has been achieved. The result is quite noticeable and can be readily demonstrated by putting in a few dividers adjacent one end of a pair of calender rolls and forming a sheet on the rolls. The composition formed in the extruding zone below the dividers will have a much better surface than the remainder of the sheet.

The following examples are illustrative of compositions which may be sheeted in accordance with the method of this invention, using the apparatus described.

*Example I*

Parts by weight
"Vinylite" (vinylchloride 85%-vinylacetate
  15%) _____ 34
"Kalvan" (whiting) _____ 42
White lead _____ 1
Pigments _____ 1
Plasticizers _____ 22

In the formation of a sheet of material from this composition, the mass may be mixed first in dry powder form and the plasticizer added by spraying the same onto the mass of powder as it is tumbled in a conical mixer. The binder-coated filler particles having the plasticizer distributed thereover may then be charged into a German mixer and a uniformly plasticized batch formed. This batch may then be broken into small particles by a scratching operation and the scratched particles fed to calender rolls such as illustrated in the drawings. In a typical calender the rolls may be 36 inches in diameter and 80 inches long, heated to a temperature of 325° F. The roll 2 may be rotated at 1 revolution per minute and the roll 3 at 1.02 revolutions per minute. The dividers may be 1⅛ inches wide and spaced 1½ inches from face to face. The rolls will be spaced at the nip to provide for the formation of a sheet of the desired thickness. The turbulent working of the plastic mass as it enters the nip will result in the formation of a smooth surfaced sheet substantially free of surface defects.

Another example, utilizing a linoleum composition, may be formulated as follows:

*Example II*

Parts by weight
Oxidized oil-resin linoleum cement _____ 35
Whiting _____ 30
Wood flour _____ 30
Pigments _____ 5

In this example, the batch will be mixed in the customary manner for linoleum manufacture and the scratched particles will be fed to calender rolls similar to the calender rolls of Example I, with the roll 2 heated to a temperature of 80° F. and rotating at 5 revolutions per minute, and the roll 3 heated to 260° F. and revolving at 5.1 revolutions per minute. A burlap backing fabric may be fed over the roll 2 and the linoleum mix calendered directly thereon. The dividers may be the same as those of Example I. The resulting sheet will be of high quality, possessing an unusually smooth and defect-free surface.

I have given two examples of compositions which may be employed in the practice of the method of the invention and which may be successfully sheeted with the apparatus. It will be understood that the invention is not limited to any particular plastic composition, for the method is of general application and the apparatus will be found useful in the working of many different types of plastic masses.

While certain preferred embodiments of the invention have been illustrated and described, it will be understood the invention is not limited thereto but may be otherwise embodied and practiced within the scope of the following claims.

I claim:

1. In a method of intensely working plastic materials, the steps comprising extruding a body of plastic material through the nip between a pair of oppositely rotating calender rolls and simultaneously therewith continuously working the body of plastic material at the nip in a pluraltiy of small increments by inducing into substantially all of said body of material as it enters said nip turbulent motions in directions generally at an angle to the length of said nip at a plurality of separate, independently spaced zones closely adjacent to one another throughout the length of the nip and simultaneously inducing lateral motions generally along the length of said nip into said small increments of plastic material as said increments are continuously delivered from said closley spaced, independent zones of turbulent motion to said nip for extrusion.

2. In a method of intensely working plastic materials, the steps comprising extruding a body of plastic material through the nip between a pair of oppositely rotating calender rolls and simultaneously therewith continuously working the body of plastic material as it is delivered to said nip in a pluraltiy of small increments by inducing into substantially all of said body of material as it enters said nip turbulent motions in directions substantially perpendicular to the length of the nip at a plurality of independently spaced zones closely adjacent to one another throughout the length of said nip and simultaneously inducing lateral motions generally along the length of said nip into said small increments of plastic material as said increments are continuously delivered from said closely spaced, independent zones of turbulent motion to said nip for extrusion.

3. In a method of forming a sheet of thermoplastic material by a calendering operation, the steps comprising extruding a body of thermoplastic material through the nip between a pair of oppositely rotating calender rolls constituting an extrusion zone and simultaneously therewith elevating the temperature of said body of thermoplastic material as it is presented for extrusion by continuously working the same as it is delivered to said nip in a plurality of small increments by inducing turbulent motions in directions generally at an angle to the length of said nip into substantially all of said body of material adjacent to said nip, said turbulent motions being effected in independently spaced zones closely adjacent to one another through the length of said nip, and simultaneously inducing lateral motions generally along the length of said nip into said small increments of thermoplastic material as said increments are continuously delivered from said closely spaced, independent zones of turbulent motion to said nip for extrusion.

4. In a method of forming a sheet of thermoplastic material by a calendering operation, the steps comprising pressing a body of thermoplastic material through an extrusion zone constituted of the nip between a pair of oppositely rotating calender rolls and elevating the temperature of the body of thermoplastic material as it is presented to said extrusion zone by continuously working the body of thermoplastic material as it is delivered to said nip in a plurality of small increments, effected by inducing into substantially all of said body of material adjacent to said nip turbulent motions in directions substantially perpendicular to the length of said nip by engagement of said increments of material with independent but closely spaced, stationary, arcuately shaped surfaces defining an apex at said nip and disposed perpendicularly to said nip throughout the effective length of the extrusion zone thereof, and simultaneously inducing lateral motions generally along the length of said nip into said small increments of thermoplastic material as said increments are continuously delivered from said closely spaced, independent zones of turbulent motion.

5. In a method of forming a smooth surfaced sheet from a mass of thermoplastic material, the steps comprising developing heat within small increments of the mass by turbulently working the mass in a plurality of separate working zones disposed adjacent to the nip, said zones being defined by curved extrusion surfaces moving toward the nip and substantially flat, arcuately shaped, closely spaced, stationary surfaces defining an apex at the nip and angularly disposed with respect to the length of said nip, simultaneously inducing lateral motions generally along the length of said nip into said small increments of thermoplastic material as said increments are delivered from said separate, closely spaced zones of turbulent motion to said nip, and continuously extruding the heated mass so delivered by passage of the same through said nip by the motion of said curved surfaces.

6. In a method of forming a sheet of thermoplastic material on a carrier by a calendering operation, the steps comprising pressing a body of thermoplastic material into an extrusion zone formed by the nip between curved surfaces moving toward said nip, one of said surfaces being a curved portion of the backing upon which the sheet is to be formed, elevating the temperature of the thermoplastic material as it is presented to said extrusion zone by continuously turbulently working it in a plurality of small increments disposed adjacent to said nip to induce motions into said increments in directions substantially perpendicular to the length of said nip in independently spaced zones closely adjacent to one another through the length of the nip, and simultaneously inducing lateral motions generally along the length of said nip into said small increments of thermoplastic material as said increments are continuously delivered from said closely spaced, independent zones of turbulent motion to said extrusion zone.

7. In an apparatus for intensely working plastic materials, the combination of a pair of rolls defining a nip therebetween for the extrusion of plastic material as a continuous sheet and a plurality of closely spaced, arcuately shaped dividers disposed in said nip, extending outwardly therefrom and terminating in apexes therein beyond which plastic material may flow in lateral motions generally along the length of said nip, said dividers comprising opposed, substantially flat, stationary working surfaces extending at an angle to the length of said nip and spaced so closely as to create turbulent motions in substantially all plastic material disposed between said surfaces and entering said nip.

8. In an apparatus for intensely working plastic materials, the combination of a pair of calender rolls defining a nip therebetween for the extrusion of plastic material as a continuous sheet, a plurality of closely spaced dividers disposed in said nip and extending outwardly from the plane of the axes of said rolls and each having opposed, substantially flat working surfaces disposed substantially normal to the axes of said rolls and effectively separating adjacent areas spaced along said roll axes into compartments of such size that turbulent motions will be obtained in plastic material disposed in said areas upon rotation of said rolls, and arcuately shaped surfaces lying substantially in the curvature of the rolls adjacent to the faces thereof and terminating in apexes disposed in the nip and beyond which plastic material may flow in lateral motions generally along the length of the nip, said apexes being disposed substantially in the plane of the axes of said rolls.

9. In an apparatus for intensely working plastic materials, the combination of a pair of rolls defining a nip therebetween for the extrusion of plastic material as a continuous sheet, a plurality of closely spaced, arcuately shaped dividers disposed in said nip, extending outwardly therefrom and terminating in apexes therein beyond which plastic material may flow in lateral motions generally along the length of said nip, said dividers having opposed working surfaces extending at an angle to the length of said nip and so spaced, one with respect to the other, that any increment of plastic material disposed therebetween will be intensely worked by the combined action of said rolls and said working surfaces as the plastic material enters said nip, and a rigid support for said dividers positioning the same in fixed relationship with respect to said rolls.

10. In an apparatus for intensely working plastic materials, the combination of a pair of calender rolls defining a nip therebetween for the extrusion of plastic material as a continuous sheet, a plurality of closely spaced dividers disposed in said nip, each having curved surfaces lying in contact with the roll surfaces and terminating in apexes in said nip beyond which plastic material may flow in lateral motions generally along the length of said nip, each of said dividers having a pair of substantially flat working surfaces extending substantially at right angles to the axes of said calender rolls and so spaced, one with respect to the other, that any increment of plastic material disposed therebetween will be intensely worked by the combined action of said rolls and said working surfaces as the plastic material enters said nip, and a rigid support for said dividers positioning the same in fixed relationship with respect to said rolls.

11. In an apparatus for intensely working plastic materials, the combination of a pair of spaced calender rolls defining a nip therebetween for the extrusion of plastic material as a continuous sheet, said rolls being rotatable in opposite directions toward said nip, and a plurality of closely spaced, arcuately shaped dividers having their curved surfaces lying substantially in the curvature of said rolls and terminating in apexes in said nip beyond which plastic material may flow in lateral motions generally along the length of said nip and each having a pair of working surfaces disposed at an angle to the roll axes and extending outwardly from said nip to define compartments between adjacent pairs of working surfaces for the reception of small increments of plastic material to be intensely worked between said working surfaces and the curved surfaces of the rolls which constitute moving bottoms for said compartments.

12. In an apparatus for forming a sheet of plastic material on a backing, the combination of a pair of spaced calender rolls, one of which is adapted to receive on its curved surface a web of backing material, means for rotating said rolls in opposite directions toward a nip therebetween to present continuously a portion of backing material at the nip for the application of plastic material as a sheet thereon, and a plurality of closely spaced, arcuately shaped dividers disposed in said nip, extending outwardly therefrom and terminating in apexes therein beyond which plastic material may flow in lateral motions generally along the length of the nip, said dividers comprising opposed, substantially flat, stationary working surfaces extending at an angle to the length of said nip and spaced so closely as to create turbulent motions in substantially all plastic material disposed between said surfaces and entering said nip defined by the curved surface of one of said rolls and the moving web of backing material.

EDWARD G. SCHAIRER.

REFERENCES CITED

The following references are of record in the file of this patent:

UNITED STATES PATENTS

| Number | Name | Date |
|---|---|---|
| 1,574,682 | Null | Feb. 23, 1926 |
| 1,924,210 | MacDonald | Aug. 29, 1933 |
| 2,317,447 | Domizi | Apr. 27, 1943 |
| 2,534,291 | Moss | Dec. 19, 1950 |